No. 624,083. Patented May 2, 1899.
W. W. PERKINS.
NUT LOCK.
(Application filed Apr. 14, 1898.)
(No Model.)

Witnesses:

Inventor
W. W. Perkins
By James Sheehy
Attorney

UNITED STATES PATENT OFFICE.

WILLIAM W. PERKINS, OF MADISONVILLE, LOUISIANA.

NUT-LOCK.

SPECIFICATION forming part of Letters Patent No. 624,083, dated May 2, 1899.

Application filed April 14, 1898. Serial No. 677,579. (No model.)

*To all whom it may concern:*

Be it known that I, WILLIAM W. PERKINS, a citizen of the United States, residing at Madisonville, in the parish of St. Tammany and State of Louisiana, have invented new and useful Improvements in Nut-Locks, of which the following is a specification.

This invention relates to improvements in nut-locks; and it has for its prime object to provide a lock for nuts and bolts which will not become loose by wear or by jar incident to the travel of cars when used on railroads or on bridges and one which will not be affected by the expansion and contraction of materials when used in different climates.

Other objects and advantages will appear from the following description and claim when taken in connection with the annexed drawings, in which—

Figure 1:
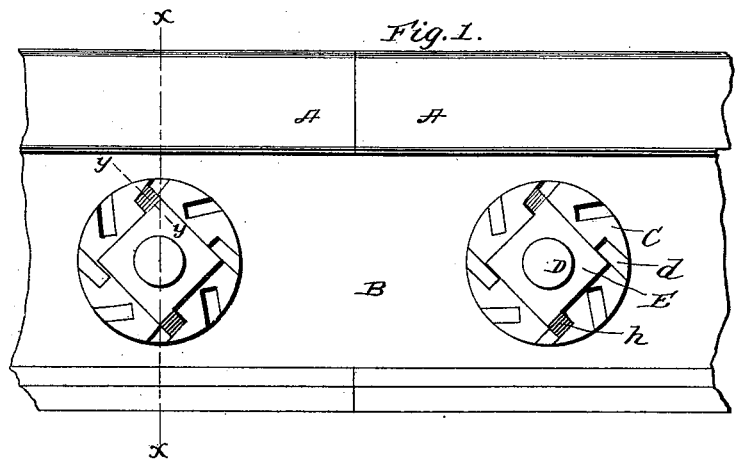
Figure 2:
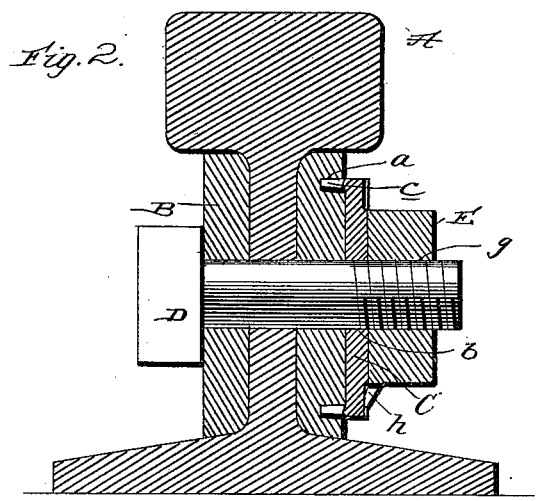
Figure 3:
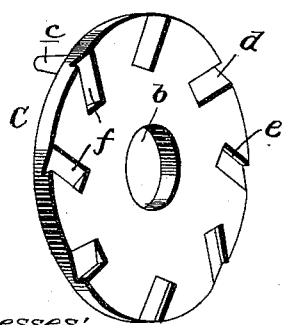
Figure 4:
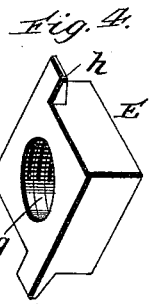
Figure 5:
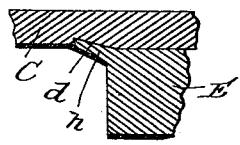

Figure 1 is a side view of a part of a pair of rails and fish-plate with my improvements applied. Fig. 2 is a sectional view taken in the plane indicated by the dotted line $x\ x$ on Fig. 1. Fig. 3 is a perspective view of the washer removed. Fig. 4 is a similar view of the nut, and Fig. 5 is a sectional view taken in the plane indicated by the dotted line $y\ y$ on Fig. 1.

Referring by letter to said drawings, A indicates parts of railway-rails, and B indicates fish-plates, such as commonly employed on railways. The rails form no part of my invention, and the only change which I make in the fish-plates as at present in use is to provide one in its outer side with a plurality of holes or recesses $a$, there being generally but two holes or recesses employed, to receive studs or lugs on a washer, as will be hereinafter more fully set forth.

C indicates the washer, which may be formed of any suitable material and of a thickness and diameter according to the services intended and the size of nut to be employed. This washer has a central hole $b$ for the passage of a bolt D, and it is provided on its inner side, and preferably at diametrically opposite points, with studs or lugs $c$ to enter the recesses $a$ of the fish-plate and keep the washer from turning with respect thereto. It is desirable to have these studs or lugs at or adjacent to the marginal edge; but they may be placed at any other suitable points. This washer has a ratchet face or outer side formed by providing slots or grooves $d$ therein. These grooves, which are disposed tangentially and extend from the marginal edge inwardly a sufficient distance, have a straight wall $e$ and an inclined base $f$ to receive the teeth of the nut.

E indicates the nut, having the usual screw-tapped central hole $g$ to receive the threaded end of the bolt, and while I have shown the nut as of a general rectangular form in outline yet it may be of polygonal or other suitable shape. This nut is provided with teeth $h$, there being two for each nut employed, and they are formed on the inner side of the nut and extend in opposite directions therefrom. In a rectangular or square nut, such as I have shown, these teeth are formed at corners diagonally opposite each other and are disposed at right angles to the sides of the nut from which they extend and have their outer sides alined with the other sides of the nut. In other words, the teeth extend from the nut in the direction in which said nut is turned off the bolt, and their outer ends are parallel to the sides of the nut, so as to enable them to impinge against the square walls $e$ of the tangentially-disposed grooves in the washer. By virtue of this it will be seen that with the nut turned up on the bolt and the teeth depressed in two of the grooves of the washer any tendency of the nut to turn off the bolt will thrust the teeth in the direction of their length against the walls $e$ of the grooves in which they rest. It will also be seen that being thrust in the direction of their length the teeth are backed by the body of the nut, and are therefore not liable to break even when weakened or impaired by being bent down into the grooves of the washer. It follows from this that two teeth $h$ are ample to lock or hold the nut against casual turning, and hence the nut may be produced almost as cheaply as the ordinary nut.

The washer is fixed to the fish-plate through the coöperation of the recesses in the plate and the studs or lugs on the washer, and the nut is prevented from turning off the bolt as long as its teeth are in engagement with the ratchet-grooves of the washer. The teeth of the washer are preferably of a shape as shown, and the nut is formed of such material as to permit of bending of the teeth. This is necessary in order to depress the teeth into the grooves or recesses of the washer, and by reason of the grooves extending to the marginal edge of the washer a chisel or other implement may be introduced beneath the teeth so as to lift them out of the grooves when it is desirable to remove the nut from the bolt. It is obvious that the nut will not disconnect itself by wear, and it will not become loose to any injurious extent by the jars and strains when used on railways.

Having thus described my invention, what I claim is—

In the nut-lock described, the combination of a threaded bolt, the washer surrounding the bolt and having an outer ratchet-face formed by a circular series of tangentially-disposed grooves $d$ therein; the said grooves extending from the edge of the washer inwardly and having inclined bases $f$ and straight walls $e$, means for fixing the washer against rotation, and the nut arranged on the bolt and having teeth $h$ at its inner side and at diagonally opposite points; the said teeth extending forwardly from the body of the nut with respect to the direction in which the nut is turned off the bolt whereby they are backed by said body, and having the square ends adapted to engage the straight walls $e$ of grooves in the washer when they are depressed into said grooves, substantially as specified.

In testimony whereof I have hereunto set my hand in presence of two subscribing witnesses.

WILLIAM W. PERKINS.

Witnesses:
 JAS. P. WILLIAMS,
 DANIEL S. KELLEY.